(12) United States Patent
Umeyama et al.

(10) Patent No.: US 10,326,123 B2
(45) Date of Patent: Jun. 18, 2019

(54) SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Yukinobu Miyamura, Osaka (JP); Hiroaki Imanishi, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/419,325

(22) Filed: Jan. 30, 2017

(65) Prior Publication Data

US 2017/0229701 A1    Aug. 10, 2017

(30) Foreign Application Priority Data

Feb. 5, 2016    (JP) .................. 2016-020636

(51) Int. Cl.
*H01M 2/34* (2006.01)
*H01M 2/06* (2006.01)
*H01M 2/30* (2006.01)
*H01M 10/42* (2006.01)
*H01M 2/04* (2006.01)

(52) U.S. Cl.
CPC ......... *H01M 2/345* (2013.01); *H01M 2/043* (2013.01); *H01M 2/06* (2013.01); *H01M 2/30* (2013.01); *H01M 10/4235* (2013.01); *H01M 2200/20* (2013.01); *H01M 2220/20* (2013.01)

(58) Field of Classification Search
None
See application file for complete search history.

(56) References Cited

FOREIGN PATENT DOCUMENTS

JP    2014-082073 A    5/2014

*Primary Examiner* — Carmen V Lyles-Irving
(74) *Attorney, Agent, or Firm* — Sughrue Mion, PLLC (57) ABSTRACT

A secondary battery includes: a battery element; a case housing the battery element; a positive-electrode external terminal and a negative-electrode external terminal provided outside the case and electrically connected to the battery element; and a short-circuiting mechanism configured to establish a short-circuit between the positive and negative external terminals through the case. The short-circuiting mechanism includes a conducting portion conductively connected to one of the positive and negative external terminals so as to face the case, an inversion plate provided at a portion of the case facing the conducting portion and configured to deform to approach the conducting portion when an internal pressure of the case rises, and a brazing material provided on one of the conducting portion and the inversion plate at a position between the conducting portion and the inversion plate.

9 Claims, 5 Drawing Sheets

| | MATERIAL | DIAMETER φ (mm) | LENGTH L (mm) | INITIAL STATE | | | FINAL STATE | |
|---|---|---|---|---|---|---|---|---|
| | | | | TEMPERATURE (°C) | DEFORMED PART | INVERSION PLATE | TEMPERATURE (°C) | ADHESION |
| EXAMPLE 1 | LEAD | 2.0 | 3.0 | 528.4 | MELTED | UNMELTED | 37.3 | GOOD |
| EXAMPLE 2 | TIN | 2.0 | 3.0 | 252.2 | MELTED | UNMELTED | 34.0 | GOOD |

FIG. 7

SECONDARY BATTERY

INCORPORATION BY REFERENCE

The disclosure of Japanese Patent Application No. 2016-020636 filed on Feb. 5, 2016, including the specification, drawings and abstract is incorporated herein by reference in its entirety.

BACKGROUND

1. Technical Field

The disclosure relates a secondary battery mounted in a vehicle.

2. Description of Related Art

Secondary batteries according to related art include a secondary battery described in Japanese Patent Application Publication No. 2014-82073 (JP 2014-82073 A), for example. The secondary battery described in JP 2014-82073 A is provided with a short-circuiting mechanism that establishes a short-circuit between an external terminal of a positive electrode and an external terminal of a negative electrode when an internal pressure of a case rises.

In the secondary battery described in JP 2014-82073 A, a part of the external terminal is disposed so as to face an inversion plate provided on a sealing body. A stacked body including a resistor and a conductive member, which are stacked each other, is provided at a portion of the external terminal, which faces the inversion plate. When the internal pressure of the case rises, the inversion plate is inverted and thus becomes electrically connected to the external terminal via the stacked body. Consequently, a short-circuit is established between the external terminal of the positive electrode and the external terminal of the negative electrode through the sealing body.

SUMMARY

However, in the secondary battery described in JP 2014-82073 A, even when the inversion plate has been inverted and thus in contact with the stacked body, large vibration of a vehicle may cause the inversion plate to vibrate and separate from the stacked body. In such a case, the state where a short-circuit is established between the external terminal of the positive electrode and the external terminal of the negative electrode cannot be stably maintained. This may reduce the reliability of the battery.

The disclosure provides a secondary battery configured to stably maintain the state where a short-circuit is established between an external terminal of a positive electrode (hereinafter, simply referred to as "positive-electrode external terminal") and an external terminal of a negative electrode (hereinafter, simply referred to as "negative-electrode external terminal") when an internal pressure of a case rises.

An aspect of the disclosure relates to a secondary battery including a battery element, a case, a positive-electrode external terminal, a negative-electrode external terminal, and a short-circuiting mechanism. The battery element is housed within the case. The positive-electrode external terminal and the negative-electrode external terminal are provided outside the case. The positive-electrode external terminal and the negative-electrode external terminal are electrically connected to the battery element. The short-circuiting mechanism is configured to establish a short-circuit between the positive-electrode external terminal and the negative-electrode external terminal through the case. The short-circuiting mechanism includes a conducting portion, an inversion plate, and a brazing material. The conducting portion is conductively connected to one of the positive-electrode external terminal and the negative-electrode external terminal such that the conducting portion faces the case. The inversion plate is provided at a portion of the case, which faces the conducting portion. The inversion plate is configured to deform so as to approach the conducting portion when an internal pressure of the case rises. The brazing material is provided on one of the conducting portion and the inversion plate such that the brazing material is positioned between the conducting portion and the inversion plate.

Here, the term "brazing material" is a material that can connect a plurality of members without melting a base material. The material (e.g. brazing filler metal) constituting the brazing material has a lower melting point than that of the member (base material) to be joined. The brazing material is melted and the melted brazing material is used as a kind of joining material, whereby the brazing material connects the plurality of members.

With this configuration, when the internal pressure of the case rises and the inversion plate is inverted, the inversion plate and the conducting portion become electrically connected to each other by the brazing material. As a result, a short-circuit is established between the positive-electrode external terminal and the negative-electrode external terminal through the case provided with the inversion plate, the inversion plate, and the conducting portion. When a short-circuit is established between the positive-electrode external terminal and the negative-electrode external terminal, a short-circuit current flows through the brazing material, and the brazing material heats up due to resistance heating. As a result, the brazing material melts and spreads out. As the brazing material spreads out while being pressed by the inverted inversion plate, the electrical resistance of the brazing material decreases, so that the amount of heat generated by resistance heating decreases. Consequently, the brazing material solidifies and the conducting portion and the inversion plate become fixed to each other. As a result, the state of electric connection between the conducting portion and the inversion plate is stable, so that the state in which a short-circuit is established between the positive-electrode external terminal and the negative-electrode external terminal can be stably maintained.

In the configuration described above, the conducting portion may include a resistor that has a higher electrical resistance than an electrical resistance of the other portion of the conducting portion, the resistor being provided at a position at which the resistor faces the inversion plate, and the brazing material may be provided so as to fix the resistor and the inversion plate to each other while electrically connecting the resistor and the inversion plate to each other when the inversion plate is in an inverted state.

With this configuration, the short-circuit current flowing through the brazing material can be regulated by the resistor when a short circuit is established between the positive-electrode external terminal and the negative-electrode external terminal. As a result, the brazing material can be stably melted.

In the secondary battery described above, the brazing material may be provided on the conducting portion.

With this configuration, the conducting portion has a flat shape, so that the brazing material can be formed more easily on the conducting portion than on the inversion plate.

In the secondary battery described above, the brazing material may have a circular cylindrical shape before the inversion plate is inverted. Further, before the inversion plate is inverted, the length of the brazing material in a direction in which the conducting portion and the inversion plate face each other may be between 2 mm and 3 mm, inclusive, and the diameter of the brazing material orthogonal to a length direction of the brazing material may be between 2 mm and 3 mm, inclusive.

Setting the length and diameter of the brazing material in this way makes it possible to prevent the inversion plate from melting, while allowing the brazing material to be melted by the short-circuit current that flows through the brazing material via the inversion plate when a short-circuit is established between the positive-electrode external terminal and the negative-electrode external terminal. As a result, the short-circuiting mechanism can be stably activated.

The disclosure makes it possible to provide a secondary battery configured to stably maintain the state where a short-circuit is established between a positive-electrode external terminal and a negative-electrode external terminal when an internal pressure of a case rises.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, example embodiments of the disclosure will be described in detail with reference to the accompanying drawings. In the example embodiments described below, like or common elements will be denoted by like reference symbols in the drawings, and descriptions of these elements will not be repeated.

Figure 1:
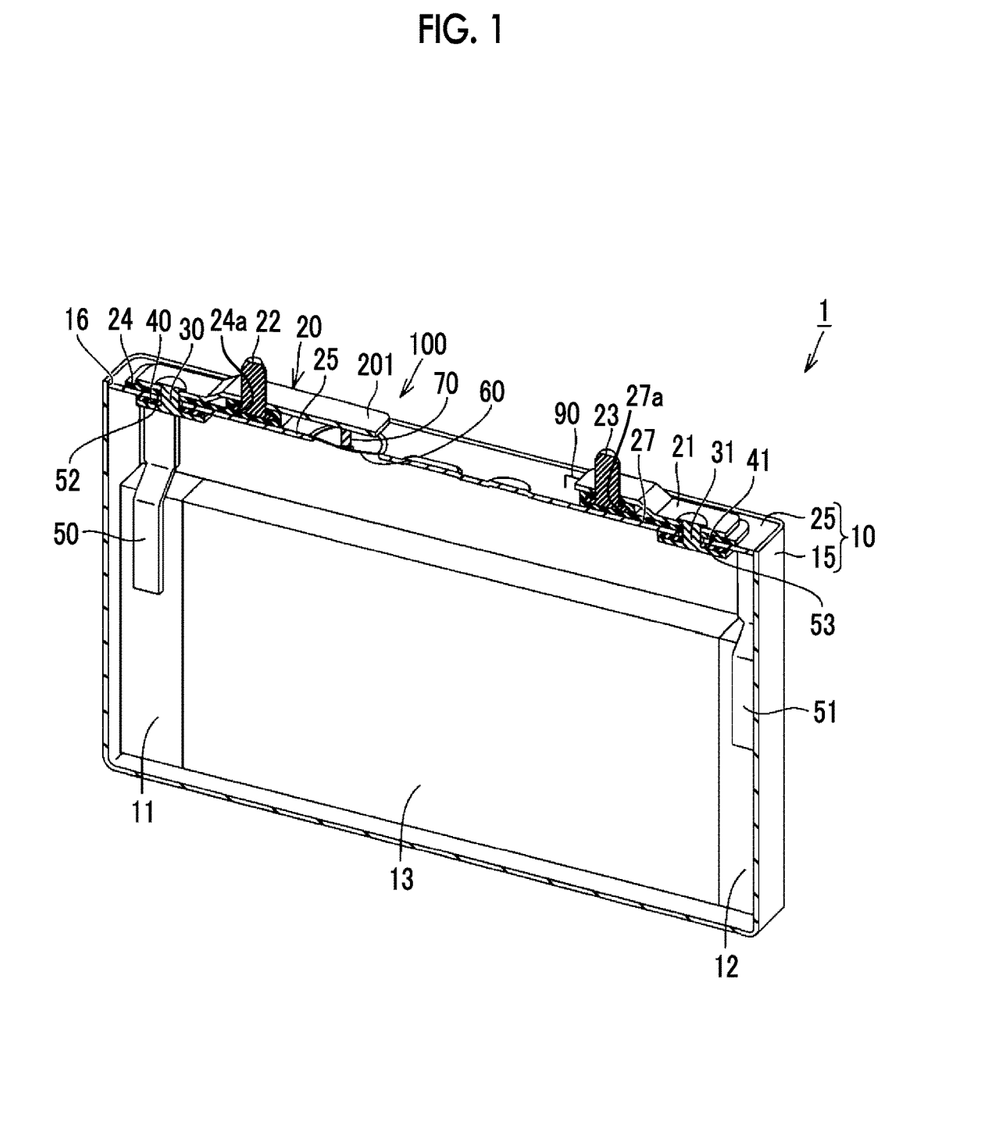
FIG. 1 is a perspective sectional view of a secondary battery according to one example embodiment.

FIG. 1 is a perspective sectional view of a secondary battery 1 according to one example embodiment. The secondary battery 1 according to the example embodiment will be described with reference to FIG. 1. The secondary batteries 1 according to the example embodiment are assembled together in series or in parallel into an assembled battery, and the assembled battery is mounted in, for example, a hybrid vehicle.

As illustrated in FIG. 1, the secondary battery 1 according to the example embodiment includes a case 10, an electrode body 13 serving as a battery element, a short-circuiting mechanism 100, an external terminal 20 of a negative electrode (hereinafter, simply referred to as "negative-electrode external terminal 20"), an external terminal 21 of a positive electrode (hereinafter, simply referred to as "positive-electrode external terminal 21"), connecting members 30, 31, a current collector 50 for the negative electrode, and a current collector 51 for the positive electrode.

The case 10 includes a housing portion 15 having a bottomed rectangular tube shape, and a sealing body 25. The electrode body 13 is housed in the housing portion 15. The sealing body 25 seals an opening 16 of the housing portion 15. The electrode body 13 (i.e., the battery element) is housed inside the case 10. The negative-electrode external terminal 20 and the positive-electrode external terminal 21 are provided outside the case 10, and are attached to the sealing body 25.

The electrode body 13 includes a positive-electrode core body, a negative-electrode core body, and a separator (none of which are illustrated). The positive-electrode core body and the negative-electrode core body are rolled with the separator interposed therebetween. A negative-electrode core body exposed portion 11 is provided at one end of the electrode body 13, and a positive-electrode core body exposed portion 12 is provided at the other end of the electrode body 13.

The negative-electrode core body exposed portion 11 is electrically connected to the negative-electrode external terminal 20 via the current collector 50 and the connecting member 30. Thus, the negative-electrode external terminal 20 is electrically connected to the electrode body 13.

The positive-electrode core body exposed portion 12 is electrically connected to the positive-electrode external terminal 21 via the current collector 51 and the connecting member 31. Thus, the positive-electrode external terminal 21 is electrically connected to the electrode body 13.

The secondary battery 1 includes, on the negative electrode side, a bolt 22, an insulator 24, and a gasket 40, in addition to the negative-electrode external terminal 20, the connecting member 30, and the current collector 50.

The insulator 24 is provided on the outside of the case 10. The insulator 24 has a recessed portion 24a. A part of the bolt 22 is housed in the recessed portion 24a. The insulator 24 is placed directly on the sealing body 25. The insulator 24 is interposed between the sealing body 25 and the negative-electrode external terminal 20. The insulator 24 is made of an insulating material, and electrically insulates the sealing body 25 from the negative-electrode external terminal 20.

The negative-electrode external terminal 20 is disposed on the insulator 24. The negative-electrode external terminal 20 is made of a conductive material, such as copper. The negative-electrode external terminal 20 is provided with a conducting portion 201 that protrudes toward the positive-electrode external terminal 21 more than the insulator 24 does, as viewed from a direction perpendicular to the sealing body 25.

The conducting portion 201 faces the sealing body 25 that constitutes a part of the case 10. The conducting portion 201 is disposed apart from the sealing body 25. The conducting portion 201 has electric conductivity. The conducting portion 201 is electrically-conductively connected to the negative-electrode external terminal 20. The conducting portion 201 may be integral with the negative-electrode external terminal 20, or may be a member different from the negative-electrode external terminal 20. When the conducting portion 201 is a member different from the negative-electrode external terminal 20, the conducting portion 201 is preferably made of a conductive material, such as copper, just like the negative-electrode external terminal 20.

The connecting member 30 is provided so as to protrude upward from an upper end portion 52 of the current collector 50. The connecting member 30 electrically connects the negative-electrode external terminal 20 and the current collector 50 to each other. The gasket 40 is disposed between the sealing body 25 and the upper end portion 52 of the current collector 50. The gasket 40 electrically insulates the sealing body 25 from the current collector 50.

The secondary battery 1 includes, on the positive electrode side, a bolt 23, an insulator 27, and a gasket 41, in addition to the positive-electrode external terminal 21, the connecting member 31, and the current collector 51.

The insulator 27 is provided on the outside of the case 10. The insulator 27 has a recessed portion 27a. A part of the bolt 23 is housed in the recessed portion 27a. The insulator 27 is placed directly on the sealing body 25. The insulator 27 is interposed between the sealing body 25 and the positive-electrode external terminal 21. The insulator 27 is made of an insulating material, and electrically insulates the sealing body 25 from the positive-electrode external terminal 21.

The positive-electrode external terminal 21 is disposed on the insulator 27. The positive-electrode external terminal 21 is made of a conductive material, such as copper. The positive-electrode external terminal 21 is electrically connected to the sealing body 25 by a conductive member 90.

The connecting member 31 is provided so as to protrude upward from an upper end portion 53 of the current collector 51. The connecting member 31 electrically connects the positive-electrode external terminal 21 and the current collector 51 to each other. The gasket 41 is disposed between the sealing body 25 and the upper end portion 53 of the current collector 51. The gasket 41 electrically insulates the sealing body 25 from the current collector 51.

Figure 2:
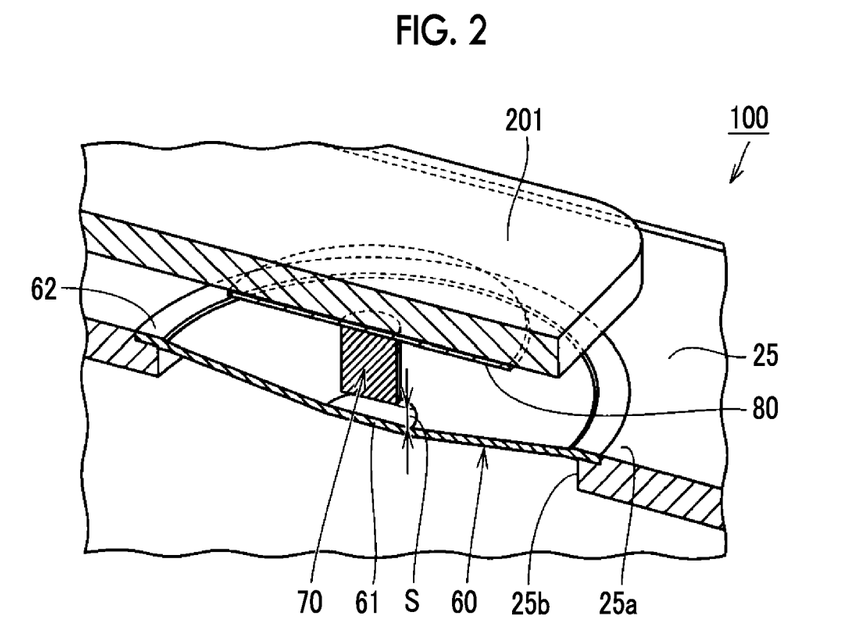
FIG. 2 is a view illustrating a state of a short-circuiting mechanism in FIG. 1 before the short-circuiting mechanism is activated.

FIG. 2 is a view illustrating a state of the short-circuiting mechanism 100 in FIG. 1 before the short-circuiting mechanism 100 is activated. The configuration of the short-circuiting mechanism 100 will be described with reference to FIG. 2.

The short-circuiting mechanism 100 includes the conducting portion 201 described above, an inversion plate 60, and brazing material 70, as illustrated in FIG. 2.

The inversion plate 60 is made of a conductive material, such as aluminum. The inversion plate 60 is in the form of a thin plate that is circular in a planar view. The thickness of the inversion plate 60 is, for example, approximately 0.3 mm, and the diameter of the inversion plate 60 is approximately 16 mm.

The inversion plate 60 is provided at a portion of the sealing body 25, which faces the conducting portion 201. More specifically, the inversion plate 60 is provided so as to close off an opening 25b provided in a portion of the sealing body 25, which faces the conducting portion 201. The inversion plate 60 is configured to deform so as to approach the conducting portion 201 when the internal pressure of the case 10 rises.

The inversion plate 60 includes a center portion (inversion plate) 61 and a peripheral edge portion 62. Before the short-circuiting mechanism 100 is activated (i.e., before the inversion plate 60 is inverted), the center portion 61 of the inversion plate 60 is positioned below the peripheral edge portion 62. After the short-circuiting mechanism 100 is activated (i.e., after the inversion plate 60 is inverted), the center portion 61 of the inversion plate 60 is positioned above the peripheral edge portion 62. The peripheral edge portion 62 of the inversion plate 60 is connected to an outside surface 25a of the sealing body 25, which is positioned around the opening 25b of the sealing body 25.

The conducting portion 201 includes a resistor 80. The resistor 80 is higher in electrical resistance than the other portion of the conducting portion 201. The resistor 80 is provided at a position at which the resistor 80 faces the inversion plate 60. The resistor 80 has, for example, a disk shape. The resistor 80 is made of, for example, a conductive ceramic.

An electrical resistance of the resistor 80 is preferably between 4 mΩ, and 6 mΩ, inclusive. When the electrical resistance of the resistor 80 is lower than 4 mΩ, an electrical resistance obtained by adding the electrical resistance of the brazing material 70 and the electrical resistance of the resistor 80 together is low. In this case, when the short-circuiting mechanism 100 is activated, as will be described later, the amount of heat generated by resistance heating in the brazing material 70 due to a short-circuit current flowing through the brazing material 70 is large, and thus the inversion plate 60 may melt due to the heat conducted through the brazing material 70.

On the other hand, when the electrical resistance of the resistor 80 is higher than 6 mΩ, an electrical resistance obtained by adding the electrical resistance of the brazing material 70 and the electrical resistance of the resistor 80 together is high. In this case, when the short-circuiting mechanism 100 is activated, the amount of heat generated by resistance heating in the brazing material 70 due to a short-circuit current flowing through the brazing material 70 is small, and thus the brazing material 70 may not melt sufficiently.

The resistor 80 may be omitted as long as appropriately setting the shape of the brazing material 70 makes it possible to appropriately control the amount of heat generated by resistance heating in the brazing material 70 due to a short-circuit current when the short-circuiting mechanism 100 is activated.

When the resistor 80 is provided, the short-circuit current flowing through the brazing material 70 can be regulated by the resistor 80. As a result, the brazing material 70 can be stably melted.

The brazing material 70 has a generally circular columnar shape. The brazing material 70 is provided on the conducting portion 201 so as to be positioned between the conducting portion 201 and the inversion plate 60. The brazing material 70 is provided so as to be connected to the resistor 80 and extend toward the inversion plate 60 from the resistor 80. The brazing material 70 is configured to fix the conducting portion 201 and the inversion plate 60 together while electrically connecting the conducting portion 201 and the inversion plate 60 together, when the inversion plate 60 is inverted.

The brazing material 70 is apart from the inversion plate 60 before the short-circuiting mechanism 100 is activated, that is, before the inversion plate 60 is inverted. A space S is left between the brazing material 70 and the inversion plate 60 before the inversion plate 60 is inverted.

Leaving the space S between the brazing material 70 and the inversion plate 60 in this way prevents a short-circuit between the negative-electrode external terminal 20 and the positive-electrode external terminal 21 from occurring when the secondary battery 1 is operating normally.

The brazing material 70 is made of a conductive material, such as lead, tin, or zinc. The brazing material 70 is constituted by a material that can connect the inversion plate 60 and the conducting portion 201 to each other without melting the inversion plate 60 itself. An alloy (brazing filler metal) constituting the brazing material 70 has a lower melting point than that of the inversion plate 60 that serves as a base material to be joined. The alloy is melted and the melted alloy is used as a kind of joining material, whereby the brazing material 70 connects the inversion plate 60 and the conducting portion 201 to each other.

The brazing material 70 is not limited to a brazing material made of a conductive material, such as lead, tin, or zinc described above. That is, the brazing material 70 may also be made of a conductive resin, a conductive rubber, or a semiconductor, as long as the material constituting the brazing material 70 has a lower melting point than that of each of the conducting portion 201 and the inversion plate 60.

When the inversion plate 60 is in the inverted state, the brazing material 70 contacts the inversion plate 60. As a result, a short-circuit current flows through the brazing material 70, and the brazing material 70 heats up due to resistance heating and thus melts. As the brazing material 70 melts, it deforms, and as a result, the amount of heat generated by resistance heating decreases. Consequently, the brazing material 70 solidifies. As a result, the brazing material 70 fixes the conducting portion 201 and the inversion plate 60 to each other.

The length of the brazing material 70 in the direction in which the conducting portion 201 and the inversion plate 60 face each other is preferably between 2 mm and 3 mm, inclusive. Further, the diameter of the brazing material 70 orthogonal to the length direction of the brazing material 70 is preferably between 2 mm and 3 mm, inclusive.

When the length and diameter of the brazing material 70 are within these ranges, the heat generated by resistance heating in the brazing material 70 due to a short-circuit current flowing through the brazing material 70 can be appropriately controlled when the short-circuiting mechanism 100 is activated. Therefore, it is possible to both prevent insufficient melting of the brazing material 70 due to insufficient resistance heating, and prevent the inversion plate 60 from melting by heat conducted via the brazing material 70 due to excessive resistance heating.

Figure 3:
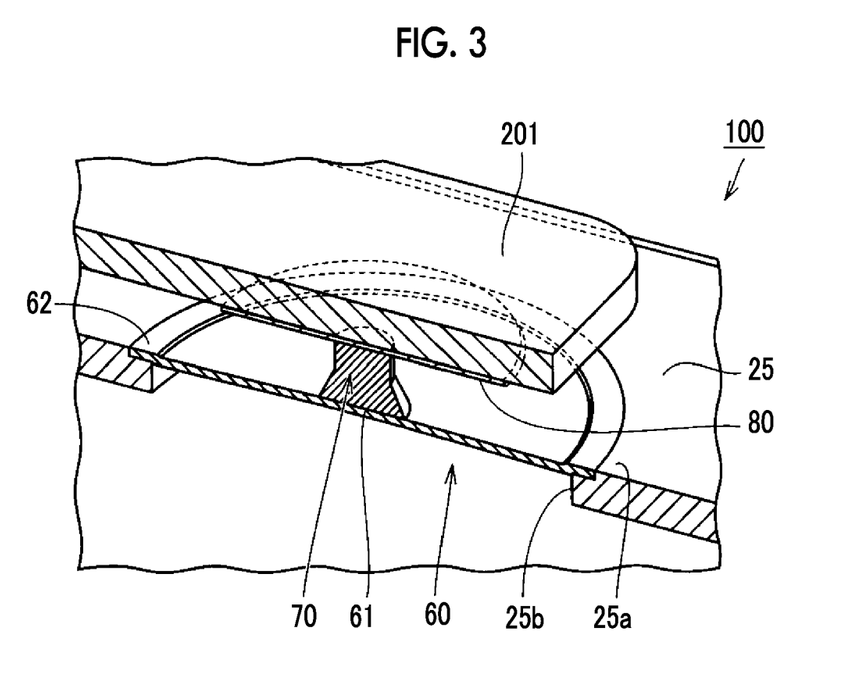
FIG. 3 is a view illustrating a state of the short-circuiting mechanism when the short-circuiting mechanism in FIG. 1 is in the course of being activated.
Figure 4:
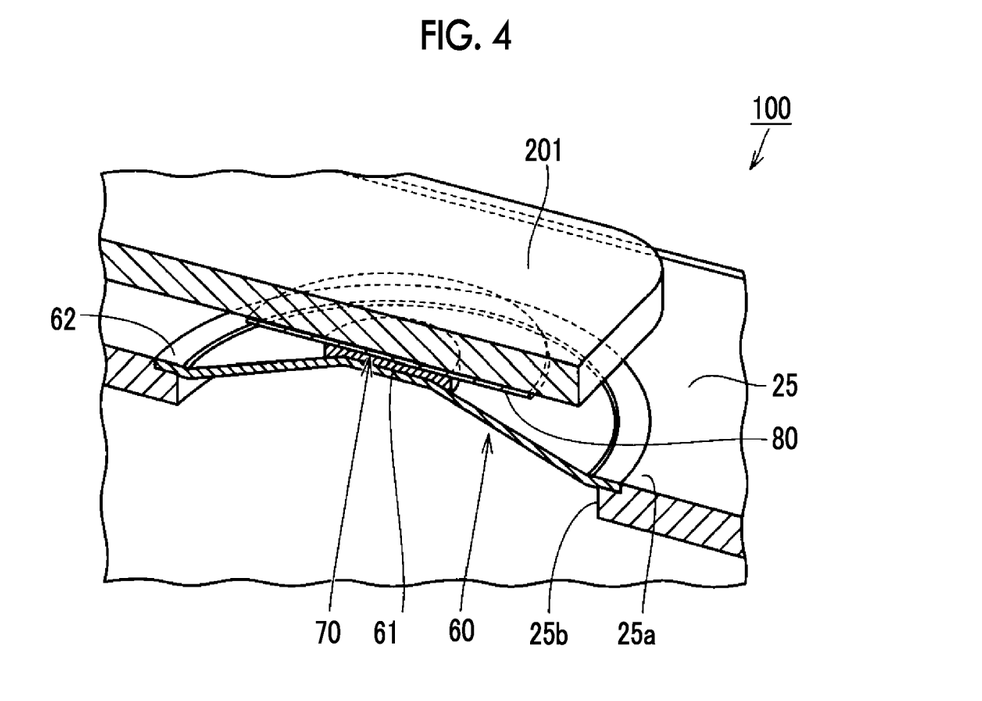
FIG. 4 is a view illustrating a state of the short-circuiting mechanism after the short-circuiting mechanism in FIG. 1 is activated.

FIG. 3 is a view illustrating a state of the short-circuiting mechanism 100 when the short-circuiting mechanism 100 in FIG. 1 is in the course of being activated. FIG. 4 is a view illustrating a state of the short-circuiting mechanism 100 after the short-circuiting mechanism 100 in FIG. 1 is activated The behavior of the short-circuiting mechanism 100 when the short-circuiting mechanism 100 is activated will be described with reference to FIG. 3 and FIG. 4.

The short-circuiting mechanism 100 is activated in response to a rise in the internal pressure of the case 10. When the short-circuiting mechanism 100 is activated, a short-circuit is established between the negative-electrode external terminal 20 and the positive-electrode external terminal 21 through the case 10.

More specifically, when gas is generated inside the case 10 by overcharging of the secondary battery 1 and thus the internal pressure of the case 10 rises and exceeds a predetermined value, the inversion plate 60 is inverted so as to approach the conducting portion 201. Consequently, the inversion plate 60 contacts a lower end side of the brazing material 70. As a result, the negative-electrode external terminal 20 and the positive-electrode external terminal 21 become electrically connected through the conducting portion 201, the brazing material 70, the inversion plate 60, the sealing body 25, and the conductive member 90 that is described above, whereby a short-circuit is established between the negative-electrode external terminal 20 and the positive-electrode external terminal 21.

When a short-circuit is established between the negative-electrode external terminal 20 and the positive-electrode external terminal 21, a short-circuit current consequently flows through the brazing material 70. As a result, the brazing material 70 itself heats up by resistance heating, and the brazing material 70 softens and melts. The inversion plate 60 then deforms such that the distance between the conducting portion 201 and the center portion 61 of the inversion plate 60 is reduced, according to the softened state and melted state of the brazing material 70.

As illustrated in FIG. 3, when the short-circuiting mechanism 100 is in the course of being activated, the lower end side of the brazing material 70 melts and spreads out in its radial direction, and the center portion 61 of the inversion plate 60 and the peripheral edge portion 62 of the inversion plate 60 are positioned on substantially the same plane.

The brazing material 70 deforms as a whole such that the brazing material 70 spreads out in its radial direction and the length of the brazing material 70 is reduced, as the softening and melting of the brazing material 70 proceeds while the brazing material 70 is pressed toward the conducting portion 201 by the inversion plate 60. As a result of such a deformation of the brazing material 70, the electrical resistance of the brazing material 70 decreases and resistance heating is significantly restrained. As a result, the brazing material 70 undergoes a change in phase from a softened state and a melted state to a solid state.

As illustrated in FIG. 4, after the short-circuiting mechanism 100 is activated, the brazing material 70 has a generally flat disk shape and is solidified. When the brazing material 70 solidifies with the brazing material 70 kept in contact with the conducting portion 201 (more specifically, the resistor 80 included in the conducting portion 201) and the inversion plate 60, the conducting portion 201 and the inversion plate 60 are fixed to each other while being electrically connected to each other by the brazing material 70. In this state, the brazing material 70 is maintained in a low resistance state, and will thus not soften and melt due to a short-circuit current.

Even when the vehicle vibrates, the conducting portion 201 and the inversion plate 60 remain electrically connected because the brazing material 70 solidifies and fixes the conducting portion 201 and the inversion plate 60 to each other. As a result, the electrical connection between the conducting portion 201 and the inversion plate 60 is stable, so that the state where a short-circuit is established between the negative-electrode external terminal 20 and the positive-electrode external terminal 21 can be stably maintained.

As a result, the state-of-charge (SOC) of the secondary battery 1 changes from an excessively charged state to a safe state, so that, for example, heat generation and damage of the secondary battery 1 due to overcharging can be suppressed. As a result, the reliability of the secondary battery 1 improves. Furthermore, in an assembled battery (a battery module) in which the secondary batteries 1 are joined together in series or in parallel, electric conduction between the adjacent secondary batteries 1 can also be reliably maintained. Therefore, even when some of the secondary batteries 1 are not functioning normally, electric power can be drawn from the remaining normally functioning secondary batteries 1 of the battery module, so that the vehicle can travel in a limp home mode.

With the configuration described above, in the secondary battery 1 according to the example embodiment, the state where a short-circuit is established between the negative-electrode external terminal 20 and the positive-electrode external terminal 21 can be stably maintained when the internal pressure of the case 10 rises.

Figure 5:
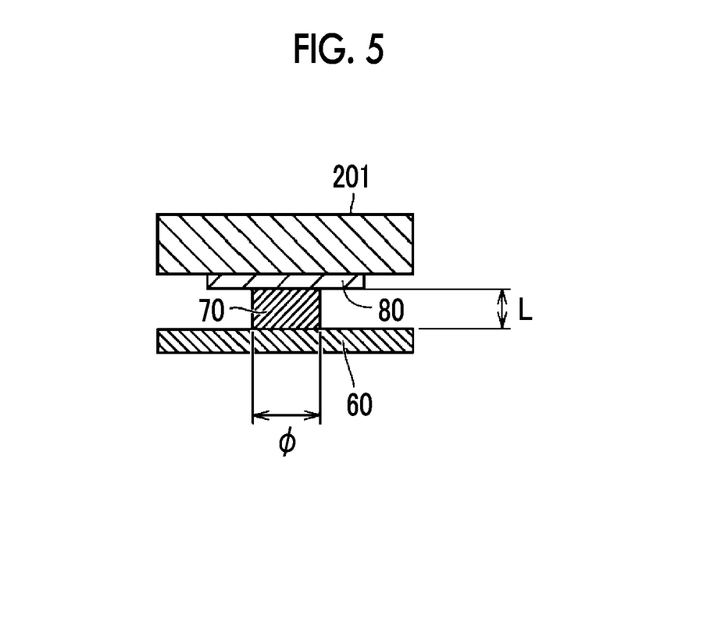
FIG. 5 is a view schematically illustrating a short-circuiting mechanism of a secondary battery used in a verification test carried out to verify the effect of the example embodiment.
Figure 6:
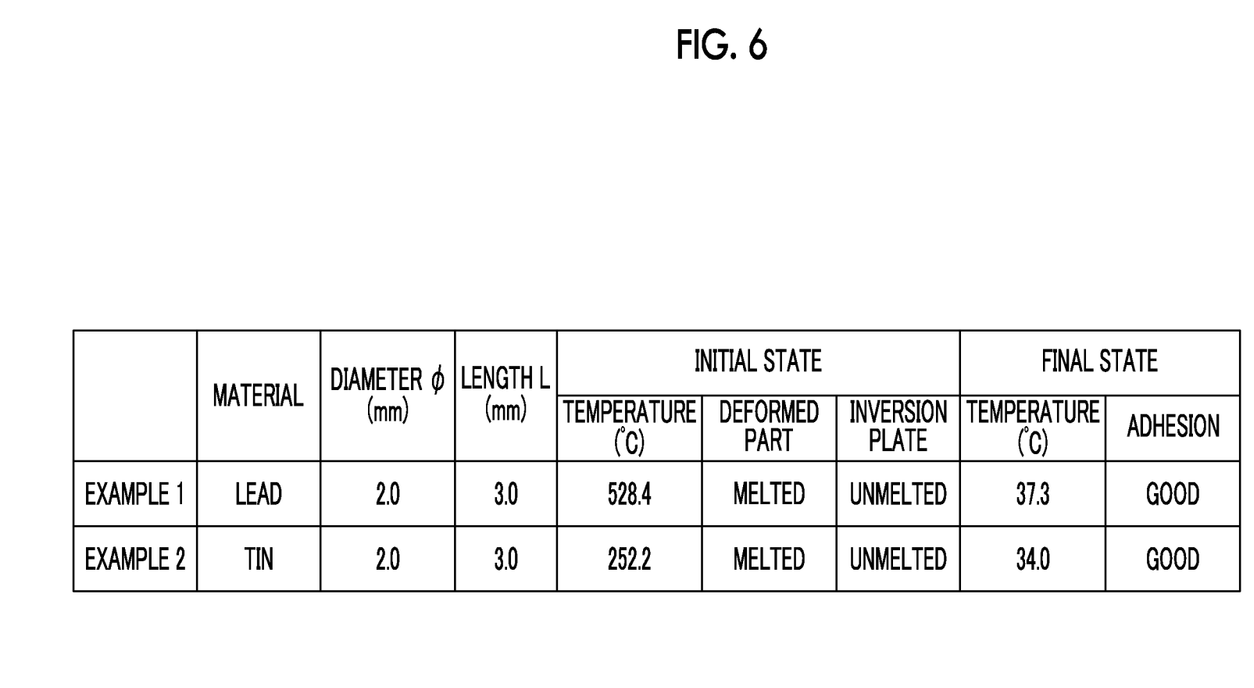
FIG. 6 is a table illustrating the conditions and results of the verification test carried out to verify the effect of the example embodiment.

FIG. 5 is a view schematically illustrating a short-circuiting mechanism of a secondary battery used in a verification test carried out to verify the effect of the example embodiment. FIG. 6 is a table illustrating the conditions and results of the verification test carried out to verify the effect of the example embodiment. The verification test carried out to verify the effect of the example embodiment will be described with reference to FIG. 5 and FIG. 6.

As illustrated in FIG. 5, short-circuiting mechanisms based on the short-circuiting mechanism 100 according to the example embodiment were prepared as short-circuiting mechanisms of a secondary battery according to Example 1 and Example 2, and the behavior of the short-circuiting mechanism 100 was verified. The short-circuiting mechanism according to Example 1 and the short-circuiting mechanism according to Example 2 differ from each other in the material of the brazing material 70.

In the short-circuiting mechanism according to Example 1, the material of the brazing material 70 was lead. Further, the diameter φ of the brazing material 70 was 2.0 mm, and the length L of the brazing material 70 was 3.0 mm.

In the short-circuiting mechanism according to Example 2, the material of the brazing material 70 was tin. The diameter φ of the brazing material 70 was 2.0 mm, and the length L of the brazing material 70 was 3.0 mm.

In the short-circuiting mechanisms according to Example 1 and Example 2, the plate thickness of the conducting portion 201 was 1.5 mm, the length of the conducting portion 201 in a planar view was 16 mm, and the width of the conducting portion 201 in a planar view was 16 mm. Further, the material of the negative-electrode external terminal 20 was copper.

Further, the plate thickness of the resistor 80 was 0.1 mm, and the diameter of the resistor 80 was 16 mm. The material of the resistor 80 was a conductive ceramic, and the electrical resistance of the resistor 80 was approximately 5 mΩ. The plate thickness of the inversion plate 60 was 1.5 mm, and the diameter of the inversion plate 60 was 16 mm. The material of the inversion plate 60 was aluminum.

The melting point of copper constituting the conducting portion 201 is approximately 1085° C., and the melting point of aluminum constituting the inversion plate 60 is approximately 660° C. The melting point of lead constituting the brazing material 70 is approximately 327.5° C., and the melting point of tin constituting the brazing material 70 is approximately 232° C. In this way, the melting point of the brazing material 70 is lower than both the melting point of the conducting portion 201 and the melting point of the inversion plate 60.

In order to verify the behavior of the short-circuiting mechanisms according to Example 1 and Example 2, the inversion plate 60 was inverted and a voltage of 4 V was applied as a voltage between the conducting portion 201 and the inversion plate 60 with the inversion plate 60 kept in contact with the brazing material 70.

In Example 1, in the initial state, the brazing material 70 was heated by resistance heating and the temperature of the brazing material 70 became 528.4° C., which is higher than the melting point of the brazing material 70. As a result, the brazing material 70 appropriately melted. On the other hand, the temperature of the brazing material 70 was lower than the melting point of the inversion plate 60, so that the inversion plate 60 did not melt.

The melted brazing material 70 was pressed by the inversion plate 60, and thus the diameter of the brazing material 70 was increased. As a result, the resistance heating of the brazing material 70 was restrained. Ultimately, the temperature of the brazing material 70 became 37.3° C. In this state, the brazing material 70 melted in the initial state was solidified, so that the conducting portion 201 and the inversion plate 60 were fixed to each other while being electrically connected to each other by the brazing material 70. As a result, the state in which a short-circuit is established between the inversion plate 60 and the conducting portion 201 was stably maintained.

In Example 2, in the initial state, the brazing material 70 was heated by resistance heating and the temperature of the brazing material 70 became 252.2° C., which is higher than the melting point of the brazing material 70. As a result, the brazing material 70 appropriately melted. On the other hand, the temperature of the brazing material 70 was lower than the melting point of the inversion plate 60, so that the inversion plate 60 did not melt.

The melted brazing material 70 was pressed by the inversion plate 60, and thus the diameter of the brazing material 70 was increased. As a result, the resistance heating of the brazing material 70 was restrained. Ultimately, the temperature of the brazing material 70 became 34.0° C. In this state, the brazing material 70 melted in the initial state was solidified, so that the conducting portion 201 and the inversion plate 60 were fixed to each other while being electrically connected to each other by the brazing material 70. As a result, the state in which a short-circuit is established between the inversion plate 60 and the conducting portion 201 was stably maintained.

In this way, it can be said that, in the secondary battery according to the example embodiment, it was also empirically confirmed that the conducting portion 201 and the inversion plate 60 can be fixed to each other while being electrically connected to each other by the brazing material 70 after the short-circuiting mechanism is activated. It can also be said that it was also empirically confirmed that the state where a short-circuit is established between the inversion plate 60 and the conducting portion 201 is stably maintained, by fixing the conducting portion 201 and the inversion plate 60 to each other while connecting the conducting portion 201 and the inversion plate 60 to each other by the brazing material 70.

In the examples described above, the diameter φ of the brazing material 70 was 2.0 mm and the length L of the brazing material 70 was 3.0 mm, but the dimensions of the brazing material 70 are not limited to these dimensions. The short-circuit current flowing through the brazing material 70 in the initial state of a short-circuit is appropriately regulated, by appropriately setting, for example, the material, diameter, and length of the brazing material 70. In this way, the conducting portion 201 and the inversion plate 60 can be fixed to each other while being electrically connected to each other by the brazing material 70 after the short-circuiting mechanism is activated.

Figure 7:
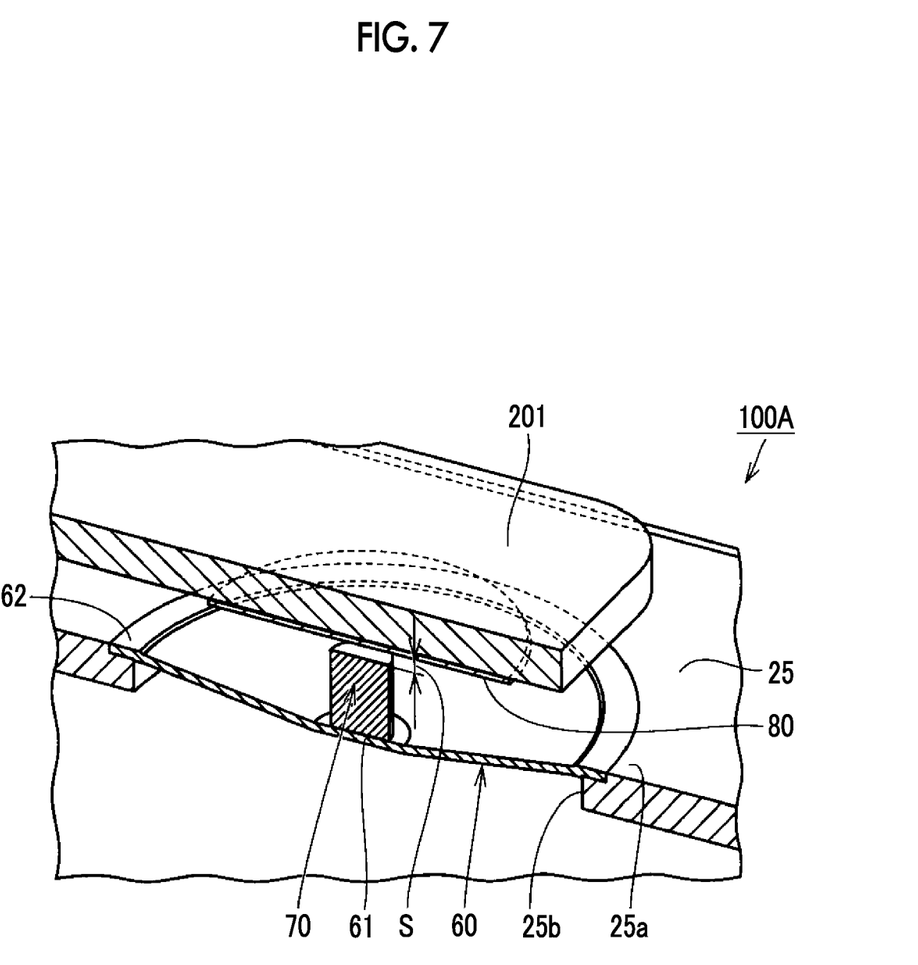
FIG. 7 is a view illustrating a state before a short-circuiting mechanism according to a modified example is activated.

FIG. 7 is a view illustrating a state before a short-circuiting mechanism 100A according to a modified example is activated. The short-circuiting mechanism 100A according to the modified example will be described with reference to FIG. 7.

The short-circuiting mechanism 100A according to the modified example differs from the short-circuiting mechanism 100 according to the example embodiment in that the brazing material 70 is provided on the inversion plate 60. In this case, before the inversion plate 60 is inverted, a space S is left between the brazing material 70 and the conducting portion 201 (more specifically, the resistor 80), and after the inversion plate 60 is inverted, the brazing material 70 contacts the conducting portion 201. With this configuration as well, a secondary battery provided with the short-circuiting mechanism 100A is able to produce substantially the same effect as that of the secondary battery 1 according to the example embodiment.

However, when the brazing material 70 is provided on the conducting portion 201 as described in the example embodiment, the conducting portion 201 has a flat shape, so that the brazing material 70 can be formed more easily on the conducting portion 201 than on the inversion plate 60.

In the example embodiment described above, the short-circuiting mechanism 100 is provided on the negative-electrode external terminal 20 side, but the location of the short-circuiting mechanism 100 is not limited to this. The short-circuiting mechanism 100 may also be provided on the positive-electrode external terminal 21 side. In this case, the positive-electrode external terminal 21 is provided with the conducting portion 201.

Moreover, the short-circuiting mechanism 100 may also be provided on each of both the negative-electrode external terminal 20 side and the positive-electrode external terminal 21 side. In this case, the conductive member 90 according to the example embodiment, which electrically connects the positive-electrode external terminal 21 and the sealing body 25 to each other, is preferably omitted.

In the example embodiment described above, a case where the conducting portion 201 is provided so as to face the sealing body 25 is described, but the conducting portion 201 may also be provided on a side surface of the case 10 (i.e., a side surface of the housing portion 15). In this case, the inversion plate 60 is provided at a portion of the side surface of the case 10, which faces the conducting portion 201.

Heretofore, example embodiments and examples of the disclosure have been described, but the example embodiments and examples disclosed herein are in all respects merely examples and should in no way be construed as limiting. The scope of the disclosure is indicated by the scope of the claims for patent, and includes all modifications that are within the scope and meanings equivalent to the scope of the claims for patent.

What is claimed is:

1. A secondary battery comprising:
   a battery element;
   a case within which the battery element is housed;
   a positive-electrode external terminal and a negative-electrode external terminal that are provided outside the case, the positive-electrode external terminal and the negative-electrode external terminal being electrically connected to the battery element; and
   a short-circuiting mechanism configured to establish a short-circuit between the positive-electrode external terminal and the negative-electrode external terminal through the case, the short-circuiting mechanism including
   a conducting portion electrically connected to one of the positive-electrode external terminal and the negative-electrode external terminal such that the conducting portion faces the case,
   an inversion plate provided at a portion of the case, the portion facing the conducting portion, and the inversion plate configured to deform so as to approach the conducting portion when an internal pressure of the case rises, and
   a brazing material provided on one of the conducting portion and the inversion plate such that the brazing material is positioned between the conducting portion and the inversion plate, a space is left between the brazing material and one of the conducting portion or the inversion plate before the inversion plate is in an inverted state, and the brazing material contacts another of the conducting portion or the inversion plate after the inversion plate is in the inverted state.

2. The secondary battery according to claim 1, wherein:
   the conducting portion includes a resistor having a higher electrical resistance than an electrical resistance of another portion of the conducting portion, the resistor being provided at a position at which the resistor faces the inversion plate; and
   the brazing material is provided so as to fix the resistor and the inversion plate to each other while electrically connecting the resistor and the inversion plate to each other when the inversion plate is in the inverted state.

3. The secondary battery according to claim 1, wherein the brazing material is provided on the conducting portion.

4. The secondary battery according to claim 1, wherein:
   the brazing material has a circular columnar shape before the inversion plate is inverted; and
   before the inversion plate is inverted, a length of the brazing material in a direction in which the conducting portion and the inversion plate face each other is between 2 mm and 3 mm, inclusive, and a diameter of the brazing material orthogonal to a length direction of the brazing material is between 2 mm and 3 mm, inclusive.

5. The secondary battery according to claim 2, wherein the brazing material is able to deform such that the brazing material spreads out in a radial direction of the brazing material and a length of the brazing material is reduced while the brazing material is pressed toward the conducting portion by the inversion plate, as the inversion plate is deformed such that a distance between the inversion plate and the conducting portion is reduced.

6. The secondary battery according to claim 5, wherein the brazing material is provided such that an electrical resistance of the brazing material decreases as the brazing material deforms such that the length of the brazing material is reduced, and the brazing material undergoes a change in phase from a softened state and a melted state to a solid state when the inversion plate is in the inverted state.

7. The secondary battery according to claim 6, wherein the brazing material is a brazing filler metal containing at least one of lead, tin, and zinc.

8. The secondary battery according to claim 2, wherein the resistor is a conductive ceramic.

9. The secondary battery according to claim 1, wherein:
   the conducting portion is electrically connected to one of the positive-electrode external terminal and the negative-electrode external terminal; and
   the other one of the positive-electrode external terminal and the negative-electrode external terminal is electrically connected to the case by a conductive member.

* * * * *